(12) United States Patent
Zhang et al.

(10) Patent No.: US 8,311,722 B2
(45) Date of Patent: Nov. 13, 2012

(54) DRIVER-BASED CONTROL SYSTEM AND METHOD TO IMPROVE FUEL ECONOMY

(75) Inventors: Mengyang Zhang, Troy, MI (US); Jayanthi Iyengar, Flushing, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 248 days.

(21) Appl. No.: 12/641,988

(22) Filed: Dec. 18, 2009

(65) Prior Publication Data
US 2011/0153175 A1    Jun. 23, 2011

(51) Int. Cl.
 *B60T 7/12* (2006.01)
(52) U.S. Cl. .......................... 701/104; 701/123
(58) Field of Classification Search .................... 701/65, 701/69, 95, 104, 123
See application file for complete search history.

(56) References Cited

U.S. PATENT DOCUMENTS

| | | | |
|---|---|---|---|
| 5,776,031 A | 7/1998 | Minowa et al. | |
| 6,188,945 B1 | 2/2001 | Graf et al. | |
| 6,292,736 B1* | 9/2001 | Aruga et al. | 701/95 |
| 6,687,602 B2 | 2/2004 | Ament | |
| 7,014,592 B2* | 3/2006 | Wiethe et al. | 477/120 |
| 7,632,212 B2* | 12/2009 | Yamanaka et al. | 477/107 |
| 2005/0187694 A1 | 8/2005 | Shiiba et al. | |
| 2007/0100512 A1 | 5/2007 | Funk | |
| 2007/0203625 A1 | 8/2007 | Quigley et al. | |
| 2008/0059035 A1* | 3/2008 | Siddiqui et al. | 701/93 |
| 2008/0097674 A1 | 4/2008 | Kuwahara et al. | |
| 2008/0120175 A1 | 5/2008 | Doering | |
| 2008/0300768 A1* | 12/2008 | Hijikata | 701/102 |
| 2009/0018738 A1* | 1/2009 | Kuwahara et al. | 701/65 |
| 2009/0043467 A1* | 2/2009 | Filev et al. | 701/57 |
| 2009/0093337 A1* | 4/2009 | Soliman et al. | 477/5 |
| 2009/0261762 A1* | 10/2009 | Tsuchiya et al. | 318/400.3 |
| 2010/0030458 A1* | 2/2010 | Coughlin | 701/123 |
| 2010/0082190 A1* | 4/2010 | Jinno et al. | 701/22 |
| 2010/0308986 A1* | 12/2010 | Dobryden et al. | 340/438 |
| 2011/0043348 A1* | 2/2011 | Blackard et al. | 340/439 |
| 2011/0126797 A1* | 6/2011 | Russell | 123/294 |
| 2011/0130934 A1* | 6/2011 | Kumazaki et al. | 701/69 |
| 2011/0187515 A1* | 8/2011 | Saito et al. | 340/425.5 |
| 2012/0089309 A1* | 4/2012 | Kim et al. | 701/58 |

FOREIGN PATENT DOCUMENTS

EP    1382477    1/2004

\* cited by examiner

*Primary Examiner* — Hussein A. Elchanti
(74) *Attorney, Agent, or Firm* — Ralph E. Smith

(57) ABSTRACT

The technology described herein provides an active driver control system. Additionally, in various example embodiments, this technology provides methods for optimizing fuel economy (or energy consumption) through active compensation of driver controlled inputs. The active compensation functionality is used to moderate 'sweet spot' vehicle response with driver desired performance. In particular, the active compensation functionality can be used to smooth the vehicle response and attenuate undesired frequency content from the driver input. One of the benefits to this technology is that it assists all drivers in achieving better fuel economy in real world driving. Another benefit is that active compensation of driver controlled inputs can mitigate some of the negative effects of more aggressive driving styles. In addition to active compensation functionality, the technology described herein is also capable of generating a Green Driver Index which is derived by quantifying the driver's control ability and normalizing the result against desired fuel economy and performance targets.

20 Claims, 3 Drawing Sheets

DRIVER-BASED CONTROL SYSTEM AND METHOD TO IMPROVE FUEL ECONOMY

FIELD OF THE INVENTION

The technology herein relates generally to improving fuel economy of a motor vehicle and more particularly to using vehicle and driver measurables to index, in real time, driver control ability and actively compensate driver input to achieve better fuel economy in real world driving.

BACKGROUND OF THE INVENTION

Real world vehicle fuel economy innately depends on driver ability and performance preference. Fuel economy is, in fact, affected substantially by how the vehicle is operated; in many cases, how the vehicle is operated can affect fuel economy more than technological improvements. Driver behaviors that contribute to decreased fuel economy include high acceleration and constant starts and stops, which consume fuel without saving time. Idling is another culprit of decreased fuel economy.

Generally, it is understood that to achieve ideal fuel economy, drivers must consistently maintain smooth acceleration and deceleration and strive to operate the vehicle in a "sweet spot"—an optimal range of engine speed and torque that will save fuel. Prior art systems (such as the systems disclosed in U.S. Patent Application Nos. 2008/0120175 and 2007/0203625) teach processing operating data from prior vehicle operation to create and display driving recommendations that can be used to address specific driving behavior affecting fuel economy, or to assist the driver in learning how to maintain the vehicle in its "sweet spot." Other systems (such as the system disclosed in U.S. Pat. No. 6,687,602) use compiled data to characterize the driver and select an appropriate level of engine displacement switching in large displacement engines where operation at full displacement is extremely inefficient.

These types of systems, however, suffer from a number of fallbacks, mainly that they do not provide any means for active compensation. These systems fail to consider that some drivers will not actively respond to coaching; others may have difficulty adapting because of slow reaction times or inexperience. Further, current techniques do not provide any real-time indexing, characterization, or feedback on the driver's actions or the vehicle's status. Accordingly, there is a need to provide a method and system for active driver control, which has these desired features.

BRIEF SUMMARY OF THE INVENTION

In various example embodiments, the technology described herein achieves fuel economy optimization through active compensation of driver controlled input(s). The technology also provides indexing and characterization of real time driving measurables, including generating driver feedback. The active compensation functionality is used to moderate 'sweet spot' vehicle response with driver desired performance. In particular, the active compensation functionality can be used to smooth the vehicle response and attenuate undesired frequency content from the driver input. One of the benefits to this system and method is that they assist all drivers in achieving better fuel economy for real world driving. Another benefit is that active compensation of driver controlled inputs can mitigate some of the negative effects of more aggressive driving styles.

It should be appreciated that this functionality is not limited to being used with conventional (i.e. internal combustion/thermal) engines; it could be used with hybrid-electric, electric and fuel cell vehicles as well. In one embodiment, instead of a chemical consumable (i.e. gasoline), the active compensation functionality could be configured to monitor electrical power consumption, for instance, to moderate battery usage in an electric vehicle. In another example embodiment, the active compensation functionality can be configured to align response to an equilibrium between usage of multiple propulsion systems (such as in a hybrid vehicle with both electric and gasoline engines).

In one example embodiment, the disclosed technology provides an index quantifier (hereinafter a "Green Driver Index") which extracts the driver's desired performance and fuel economy goals and compares them to a quantification of the driver's control ability. The quantification is based on extraction of underlying acceleration and deceleration targets, pedal position, rate of change of pedal position, and actual vehicle speed and acceleration. Alternatively, the Green Driver Index can be based on a comparison of driver control ability to standardized fuel economy measurements for a given vehicle. The Green Driver Index, which is quantified in real-time, is normalized and preferably output to a display for observation by the driver. It can also be recorded for subsequent downloading and analysis.

In another example embodiment, the disclosed technology provides active compensation of driver controlled inputs (hereinafter "Active Green Mode") to actively attenuate undesired frequency content from the driver's pedal movements such that the actual vehicle responses (speed and acceleration) closely follow the driver's intended vehicle control targets.

In another example embodiment, the Active Green Mode is used in combination with driver input preferences (hereinafter "Active Driver Command Manager") such that a driver's intended performance and fuel economy goals can be selected from a plurality of modes or settings presented to the driver on a display, or learned from analysis of lagging Green Driver Index data or other quantifiable measures of driver control ability. In yet another example embodiment, the Active Driver Command Manager is connected to and receives inputs from other control and safety systems of the vehicle, including electronic stability protection (ESP), anti-lock braking systems (ABS), proximity, navigation, and traffic control systems.

In a further example embodiment, the disclosed technology provides a display that outputs driver feedback information, including a real-time Green Driver Index, current and lagging fuel economy of the vehicle. The display also provides an interface for the Active Driver Command Manager.

There has thus been outlined, rather broadly, the features of the technology in order that the detailed description that follows may be better understood, and in order that the present contribution to the art may be better appreciated. There are additional features of the technology that will be described and which will form the subject matter of the claims. Additional aspects and advantages of the technology will be apparent from the following detailed description of an example embodiment which is illustrated in the accompanying drawings. The technology is capable of other embodiments and of being practiced and earned out in various ways. Also, it is to be understood that the phraseology and terminology employed are for the purpose of description and should not be regarded as limiting.

BRIEF DESCRIPTION OF THE DRAWINGS

The technology is illustrated and described herein with reference to the various drawings, in which like reference numbers denote like method steps and/or system components, and in which.

DETAILED DESCRIPTION OF THE INVENTION

Before describing the disclosed embodiments of the technology in detail, it is to be understood that the technology is not limited in its application to the details of the particular arrangement shown here since the technology is capable of other embodiments. Also, the terminology used herein is for the purpose of description and not of limitation.

In various example embodiments, the technology described herein increases vehicle fuel economy by monitoring driver controlled inputs and actively attenuating vehicle response based on pedal position, rate of change of pedal position, and actual vehicle speed and acceleration. The active compensation functionality is used to correlate 'sweet spot' vehicle response with driver desired performance.

Figure 1:
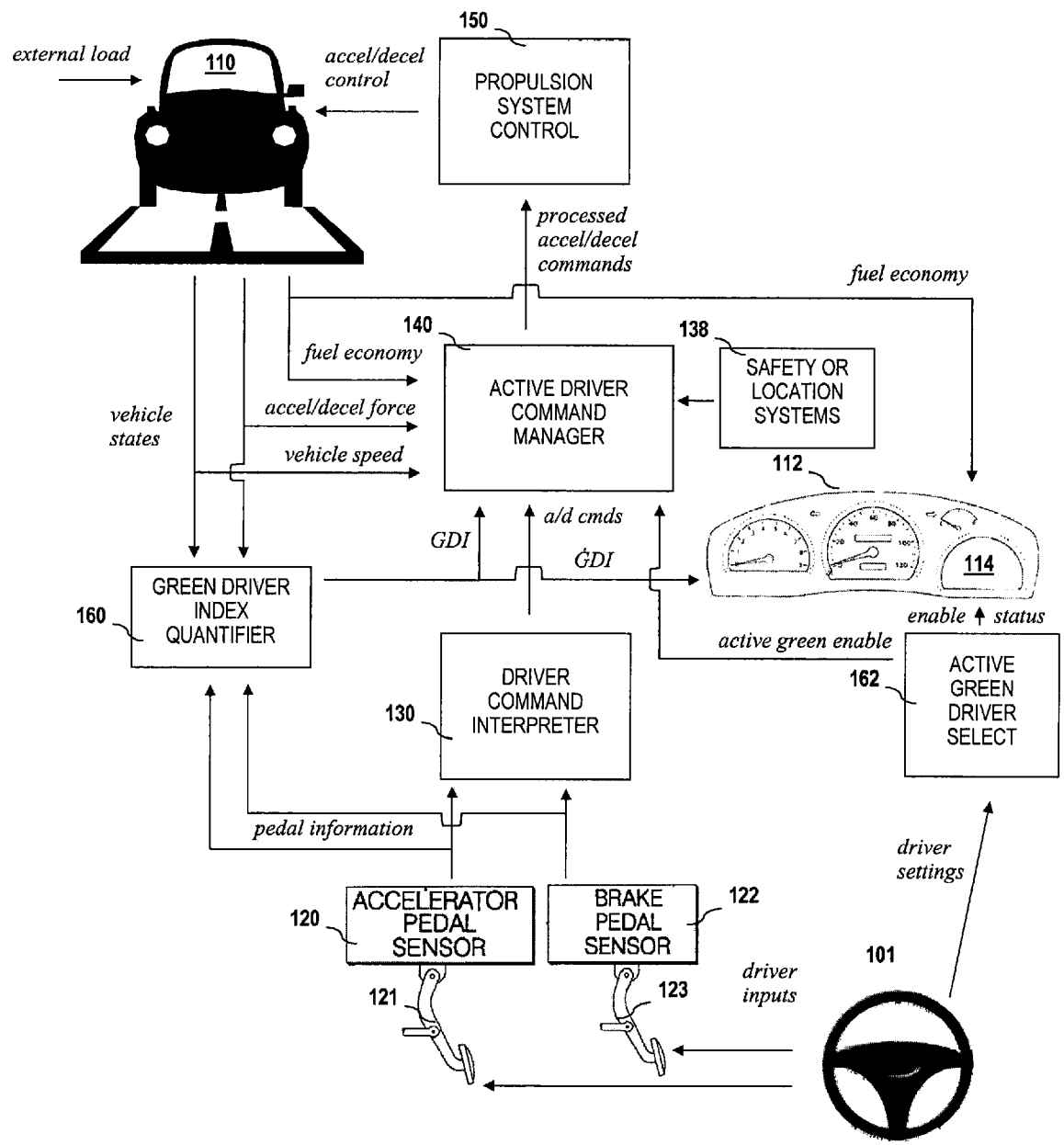
FIG. 1 illustrates an active driver control system in accordance with an embodiment described herein.

Referring now to FIG. 1, which shows an active driver control system 100, driver 101 operates vehicle 110 by actuating the accelerator control pedal 121 and brake control pedal 123. Pedal actuation is detected by accelerator pedal sensor 120 and brake pedal sensor 122, respectively. Propulsion control is not limited to actual physical control pedals such as accelerator control pedal 121 and brake control pedal 123, and could include other types of controls not pictured, e.g., hand controls. The driver 101 may also have a plurality of other vehicle controls to activate or deactivate vehicle safety and location systems 138, e.g., electronic stability protection and anti-lock brake systems. These controls are not shown for simplicity purposes, but data from these systems 138, which includes installed ESP, proximity, navigation, and traffic control systems, is available to active driver control system 100, if desired.

The active driver control system 100 includes a driver command interpreter 130, for receiving the information from accelerator pedal sensor 120 and brake pedal sensor 122, as well as other driver controlled inputs. The driver command interpreter formats these commands and sends them to active driver command manager 140 for processing. After processing, the commands are sent to propulsion system control 150.

The vehicle 110 has a dashboard 112, which includes a plurality of displays such as a speedometer, tachometer, odometer and fuel gauge. In one embodiment, the dashboard 112 includes an additional display 114 for displaying information relevant to the active driver control system 100. As described in more detail below, this additional display 114 can be programmed to display fuel economy, system status, and other quantified information for use by the driver 101.

One such item for display is retrieved from a real time Green Driver Index Quantifier 160, which calculates the driver's 101 Green Driver Index (GDI) by extracting the driver's underlying acceleration and deceleration targets and comparing them to a quantification of the driver's control ability. This quantification can include, among other things, accelerator and brake pedal position, rate of change in pedal positions, and actual vehicle speed and acceleration. Alternatively, the GDI can be based on a quantification of driver control ability (the factors discussed above) to standardized fuel economy measurements for a given vehicle.

Figure 2:
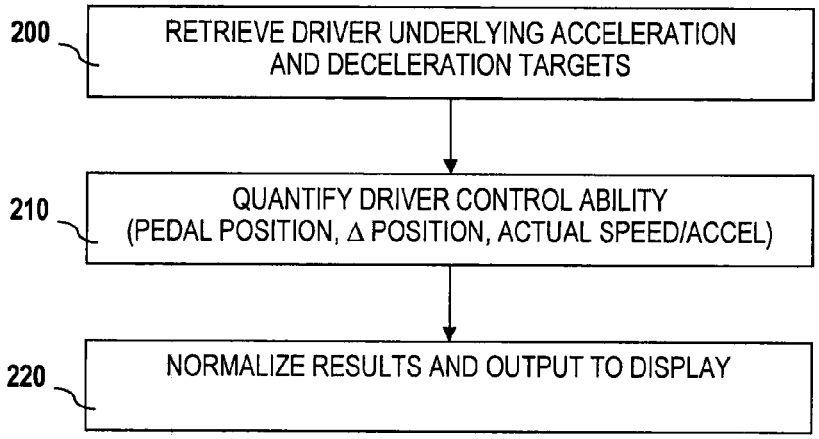
FIG. 2 is a flow diagram of an example green driver index monitoring process.

GDI determination is shown in FIG. 2. The driver's 101 underlying acceleration and deceleration targets or performance and fuel economy goals are retrieved at step 200. Next driver's 101 control ability is then quantified at step 210. At step 220, the Green Driver Index is normalized against desired fuel economy and performance targets, preferably on a scale of 200 with a mean of 100. In one embodiment, referring again to FIG. 1, the Green Driver Index is expressed as a percentage multiple of average fuel economy for the vehicle 110. The Green Driver Index can also employ data from non-control vehicle safety and location systems 138. For instance, Green Driver Index Quantifier 160 can adjust the normalization based on a information from a navigation system which would indicate whether the vehicle 110 is engaged in city or highway driving. Other, non-numerical scales could also be used, such as normalization to a color scheme (e.g., red is a low Green Driver Index, yellow a satisfactory Green Driver Index, and green a good Green Driver Index).

The display 114 also includes hardware or software controls 162 for activation or deactivation of the active driver control system 100. In one embodiment, the hardware or software controls allow driver 101 to turn on/off Active Green Mode. In another embodiment, activation or deactivation of Active Green Mode may be performed automatically by active driver control system 100 based on a detection of one or more conditions, e.g., weather. The controls 162 may include settings for a driver's 101 desired performance response targets (e.g., leisure, sport) and fuel economy (e.g., standard, enhanced). Although this information is ideally incorporated into its own display 114, it is understood that the information could also be input and displayed as part of a common information panel on the dashboard 112, or central computer or navigation system.

Figure 4:
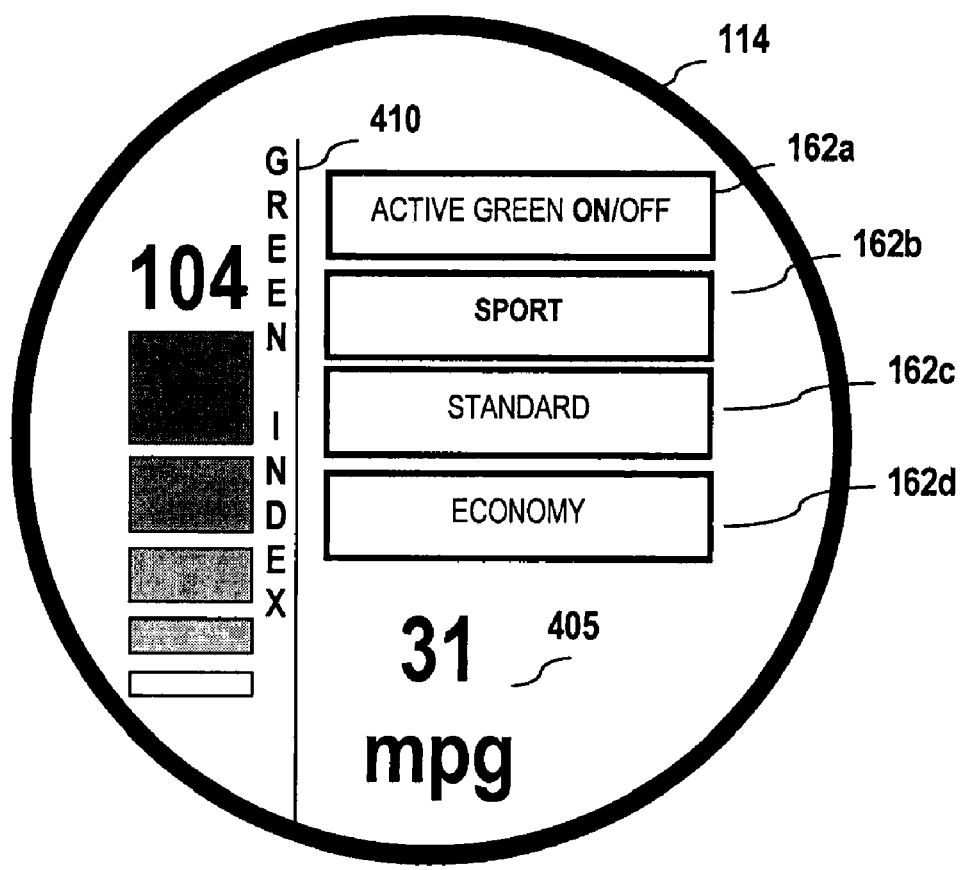
FIG. 4 illustrates a display in accordance with an embodiment described herein.

One embodiment of display 114 is illustrated in FIG. 4, showing a plurality of controls 162a-d for activating Active Green Mode and selection of an operation mode, as well as fuel economy gauge 405 and current Green Driver Index 410.

Figure 3:
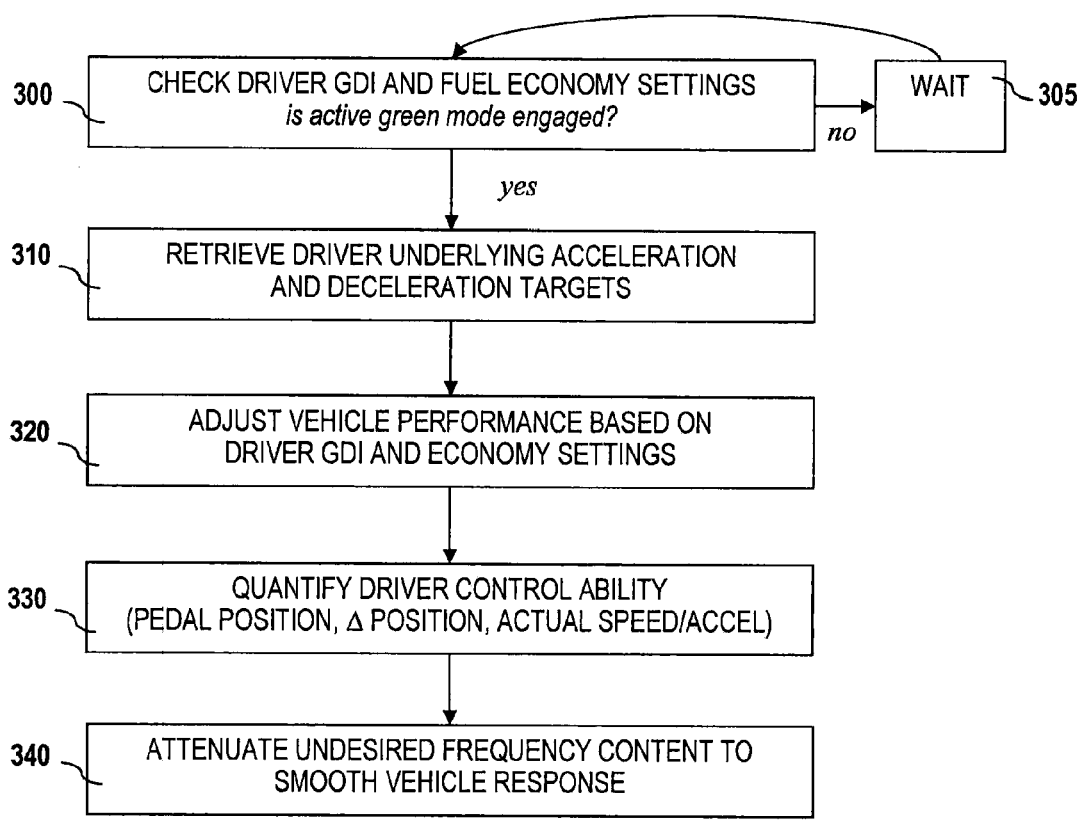
FIG. 3 is a flow diagram of an example active green mode correction process.

In Active Green Mode operation (shown in FIG. 3), driver inputs are also processed at the active driver command manager 140. At step 300, the active driver control system 100 checks to see if Active Green Mode has been enabled by the driver 101.

When Active Green Mode is not enabled, driver inputs to the accelerator pedal 121 and brake pedal 123 are sent (via sensors 120, 122) to the active driver command manager 140, which passes them through to propulsion system control 150.

At step 310, when Active Green Mode is activated, the control system 100 retrieves the driver's 101 underlying acceleration and deceleration targets. Desired fuel economy and performance targets, including a predetermined acceleration or deceleration curve, can also be retrieved and used at this step. The targets can be collectively expressed as a plurality of modes, e.g., "economy," "normal," or "sporty." In another embodiment, the acceleration and deceleration targets can be extrapolated from analysis of Green Driver Index over a specified time.

Next, at step 320, any non-driver-controllable performance changes to the vehicle based on the desired fuel economy and performance targets of the driver 100 are implemented. This may include, among other things, changing the engine's variable displacement scheme or valve timing, on a hybrid, increasing the time the vehicle 110 operates on battery power, adjusting a variable suspension, closing the sunroof, and/or lowering a spoiler. It is understood that these changes may account for a significant portion of the control needed to achieve the driver's fuel economy and performance targets. In this case, the active driver command manager 140 can limit the level of active attenuation of driver commands so as to be less perceptible to the driver.

At step 330, the active driver command manager 140 processes the driver's fuel economy and performance targets along with a plurality of operating parameters, e.g., information about the state of the vehicle. This information can include real-time GDI from the Green Driver Index Quantifier 160, input from safety and location systems 138, and other real-time information from vehicle 110 including actual vehicle speed, acceleration, and current and historical fuel economy, as well as external loads acting on the vehicle (such as wind speed, precipitation). Acting on this information, at step 340, the active driver command manager 140 attenuates driver controlled input (from at least sensors 120, 122) to achieve the desired performance response (e.g., a smoother acceleration and deceleration curve) and fuel economy by attenuating acceleration and deceleration commands to propulsion system control 150. The attenuated acceleration and deceleration commands are also calculated to reduce undesired frequency content, such as inconsistent start/stop motion of the driver and uneven pedal application. This active attenuation can greatly increase real world vehicle fuel economy without a substantial effect on a driver's perception of the vehicle's performance. As discussed above, active attenuation may also be based on information from a navigation system 138 which would indicate whether the vehicle 110 is engaging in city or highway driving.

Although the above described embodiments focus on conforming a vehicle's performance to the driver's performance and fuel economy goals, it is also understood the active driver command manager 140 could be programmed to meet externally-devised goals, such as corporate goals associated with a fleet of vehicles.

It should be appreciated that the active driver command manager 140 is not limited to being used with conventional (i.e. internal combustion/thermal) engines. Active driver command manager 140 could be used with hybrid-electric, electric and fuel cell vehicles as well. All of the description above is equally applicable to such other energy sources. It is understood that instead of a chemical consumable (i.e. gasoline), the active driver command manager 140 could be configured to monitor electrical power consumption, for instance, to moderate battery usage in an electric vehicle. It is further understood that in hybrid power source vehicles (e.g., those with both electric and gasoline engines), the desired sweet spot might be an equilibrium between usage of both those propulsion systems.

It also should be appreciated that any or all of the driver command interpreter 130, active driver command manager 140, propulsion system control 150, green driver index quantifier 160 or active green driver select control 162 can be implemented as software stored on a storage medium within the vehicle and run on the vehicle's computer system or in specialized hardware. It is further understood that active driver command manager 140 could be programmed by integration of a wireless or cellular network interface (not pictured).

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology and are intended to be covered by the following claims.

What is claimed is:

1. An active driver control system for a vehicle, comprising:
   a driver command interpreter coupled to a plurality of driver inputs; and
   an active driver command manager receiving a plurality of inputs including acceleration and deceleration commands from the driver command interpreter and vehicle data corresponding to a plurality of operating parameters, the active driver command manager using the vehicle data to actively attenuate the acceleration and deceleration commands to conform acceleration and deceleration of the vehicle to achieve predetermined consumption targets and to reduce undesired frequency content;
   wherein the active driver command manager attenuates driver controlled input from at least an accelerator pedal sensor and a brake pedal sensor; and
   wherein a driver index quantifier calculates a driving index based on a comparison of driver targets to a quantification of driver control ability.

2. The system of claim 1, further including electronic engine and brake controls adapted to apply attenuated acceleration and deceleration commands from the active driver command manager.

3. The system of claim 1, wherein the driver inputs include an accelerator pedal and brake pedal connected to an accelerator pedal sensor and a brake pedal sensor, respectively.

4. The system of claim 2, wherein the acceleration and deceleration commands are attenuated to smooth frequency content from the accelerator pedal sensor or brake pedal sensor.

5. The system of claim 2, wherein the acceleration and deceleration commands are attenuated to conform them to a predetermined acceleration or deceleration curve.

6. The system of claim 5, wherein the predetermined acceleration or deceleration curve is programmable by the driver.

7. The system of claim 5, wherein the acceleration and deceleration commands are attenuated to conform them to one of a plurality of driver-selected operation modes of the vehicle.

8. The system of claim 7, wherein the driver-selected operation modes include a mode in which fuel economy is maximized, a mode in which performance of the vehicle is maximized, and a mode which equally moderates vehicle performance and fuel economy.

9. The system of claim 1, wherein the active driver command manager further receives input from a navigation system, and the acceleration and deceleration commands are attenuated to conform them to a location of the vehicle.

10. The system of claim 1, wherein the active driver command manager is operable to control non-driver-controlled vehicle systems to assist in conforming acceleration and deceleration of the vehicle to performance and fuel economy targets.

11. The system of claim 10, wherein the active driver command manager is operable to control valve timing of an engine of the vehicle.

12. The system of claim 10, wherein the active driver command manager is operable to control a response level of a suspension of the vehicle.

13. A method of actively compensating driver input to a vehicle, the method comprising:

receiving acceleration and deceleration commands input by the driver; and attenuating the acceleration and deceleration commands to conform acceleration and deceleration of the vehicle to predetermined performance and fuel economy targets, and to reduce undesired frequency content;

wherein an active driver command manager attenuates driver controlled input from at least an accelerator pedal sensor and a brake pedal sensor; and wherein a driver index quantifier calculates a driving index based on a comparison of driver targets to a quantification of driver control ability.

14. The method of claim 13, wherein the performance and fuel economy targets are programmed by the driver.

15. The method of claim 13, wherein the acceleration and deceleration commands are attenuated to conform them to a predetermined acceleration or deceleration curve corresponding to the performance and fuel economy targets.

16. The method of claim 13, further comprising quantifying driver control ability by normalizing at least one of pedal sensor position, observed frequency response in pedal sensor position and actual speed and acceleration of the vehicle against ideal operating characteristics of the vehicle.

17. The method of claim 14, further comprising displaying the results of the quantifying step to the driver.

18. The method of claim 13, further comprising displaying the amount of attenuation to the driver.

19. The method of claim 13, wherein the acceleration and deceleration commands are attenuated to compensate for external loads acting on the vehicle.

20. The method of claim 13, further comprising activating or deactivating a plurality of vehicle systems to assist in conforming acceleration and deceleration of the vehicle to the performance and fuel economy targets.

* * * * *